United States Patent [19]

Gaydos

[11] Patent Number: 5,071,444
[45] Date of Patent: Dec. 10, 1991

[54] APPARATUS FOR MOVING A BATTERY CELL

[75] Inventor: Mark C. Gaydos, Greenfield, Mass.
[73] Assignee: Hardigg Industries, Deerfield, Mass.
[21] Appl. No.: 510,129
[22] Filed: Apr. 17, 1990
[51] Int. Cl.⁵ .......................................... H01M 10/42
[52] U.S. Cl. .................................... 29/623.1; 29/730; 429/49
[58] Field of Search .................. 29/730, 623.1; 429/48, 429/49

[56] References Cited

U.S. PATENT DOCUMENTS

| 4,074,017 | 2/1978 | Kinsey | 429/49 X |
| 4,509,252 | 4/1985 | Sabatino et al. | 29/623.1 |
| 4,529,020 | 7/1985 | Hoover et al. | 29/623.1 |

FOREIGN PATENT DOCUMENTS

| 392575 | 11/1973 | U.S.S.R. | 429/730 |

Primary Examiner—Stephen J. Kalafut
Attorney, Agent, or Firm—Fishman, Dionne & Cantor

[57] ABSTRACT

An apparatus for moving an industrial wet battery cell is disclosed. The apparatus includes a clamping device for gripping the terminals of the cell and a fluid transfer device for reducing pressure within the battery cell by removing electrolyte from the cell. A process for transferring a battery into a container is also disclosed.

18 Claims, 4 Drawing Sheets

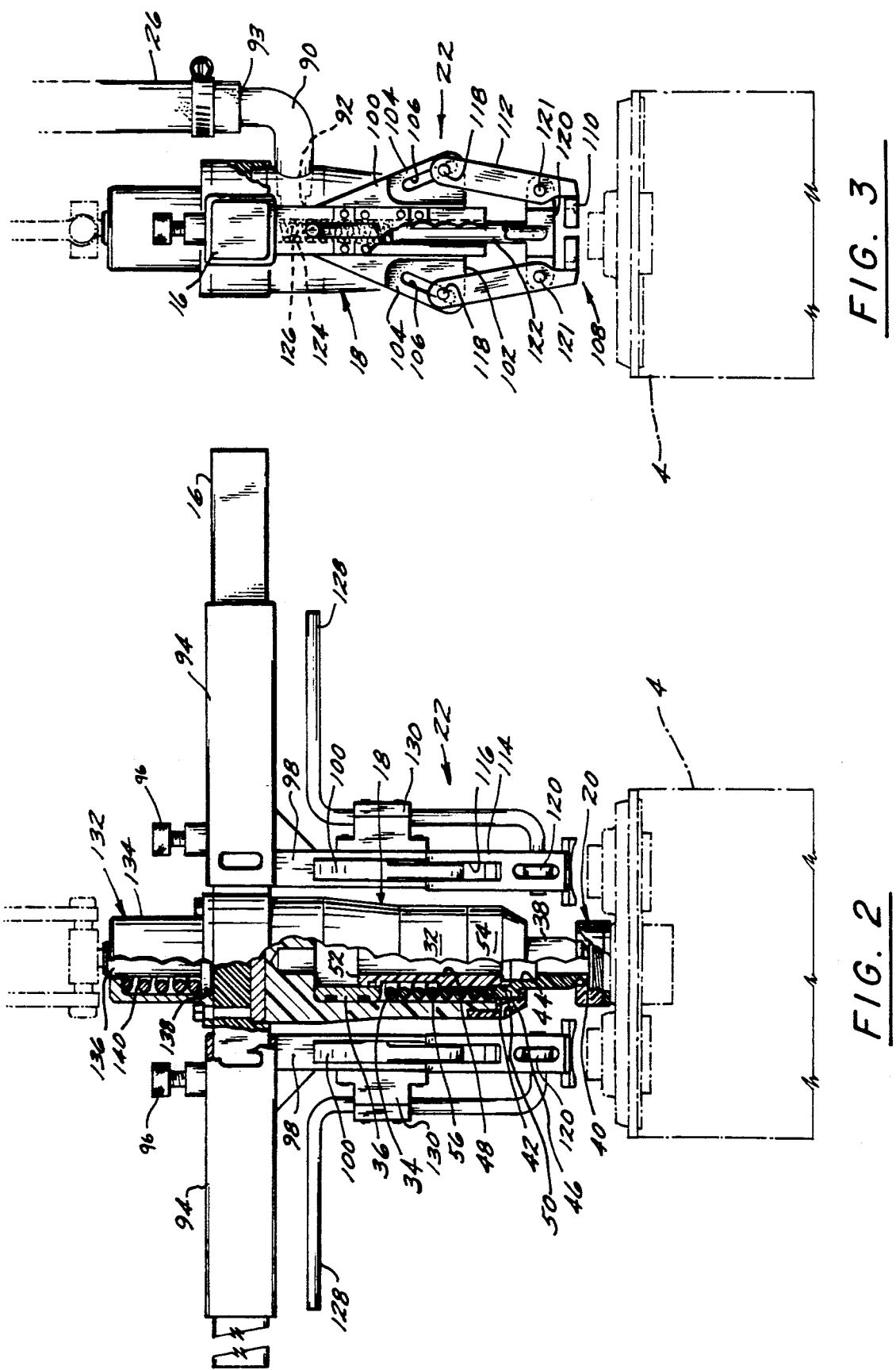

APPARATUS FOR MOVING A BATTERY CELL

BACKGROUND OF THE INVENTION

Industrial wet battery cells typically include a rectilinear cell housing, a plurality of electrode plates with the housing and a pair of terminals protruding from the housing. The cell housing also contains an amount of sulfuric acid electrolyte sufficient to cover the electrode plates. The cells typically have a small horizontal cross sectional area e.g. to 4"×6" but are relatively tall, e.g. 1 to 2 feet. Typically, the cell housing is made up of a thick bottom wall, four relatively thin side walls and a top. An electrolyte orifice is typically defined in the top of the housing for adding electrolyte to the cell housing. The liquid head provided by the column of sulfuric acid electrolyte within the cell housing causes the side walls of an unsupported cell to bulge outwardly.

A typical battery cell is quite heavy, i.e. on the order of 50 to 300 pounds, and very awkward to handle. It is, however, necessary to handle full cells on occasion, e.g. to transfer cells into an apparatus in which the cell is to be used to supply power, e.g. into the battery box of a fork lift truck. In those situations the cells are typically handled with a lifting device, i.e. a chain lift and apparatus which grips the terminals of the cell. The process is awkward and dangerous to the extent that it involves potential spillage of the extremely corrosive electrolyte.

The transfer operation is further complicated by the above noted dimensional changes in an unsupported cell housing that are brought about by the pressure exerted by the electrolyte. The apparatus in which the cell is used typically provide support to the thin sidewalls of the cell housing to prevent them from bulging. It is very difficult to transfer cells into a tight fitting container since the bulging of unsupported sidewalls hinders insertion of a cell into the tight fitting container. Electrolyte may be ejected from the cell when the bulging sidewalls are compressed to fit the cell into the tight fitting container.

A process for transferring a battery cell into a container is also disclosed. The process includes steps of gripping the terminals of the battery, reducing pressure within the battery by withdrawing fluid electrolyte from the cell housing, lifting the cell while maintaining the reduced pressure within the cell housing and placing the cell in the container while maintaining the reduced pressure within the cell housing.

SUMMARY OF THE INVENTION

An apparatus for moving a battery cell is disclosed. The battery cell includes a cell housing, a plurality of electrode plates within the housing, a pair of terminals extending outwardly from the cell housing and an electrolyte orifice. The cell housing contains a fluid electrolyte. The apparatus includes a clamp means for gripping the terminals of the battery and fluid transfer means for reducing pressure within the housing.

In a preferred embodiment, the clamp means includes a pair of opposed jaws, each having a gripper portion and a lever arm extending from the gripper portion to a first end, fulcrum means for pivotably securing the lever arms, wedge means for guiding said first end of said lever arms and handle means for moving said fulcrum means and said lever means relative to said wedge means.

In a preferred embodiment the fluid transfer means includes a valve means, attachable to said cell housing through said electrolyte orifice, for allowing fluid flow out of said cell housing and preventing fluid flow into said housing and a vacuum means for removing fluid electrolyte from the cell housing through the valve means. The vacuum means includes a pump, an extraction head for establishing fluid flow connections between the valve means and the inlet side of the pump and a reservoir means in fluid flow connection with the outlet side of the pump for receiving fluid electrolyte from said cell.

In a preferred embodiment, the apparatus includes a frame for securing the clamp means and extraction means in a fixed spatial relationship so that the extraction head is automatically secured in fluid flow connection with the valve means when the valve means is attached to the cell housing and the clamp means are disposed in a gripping relationship with the terminals.

A process for transferring a battery cell to a container is also disclosed. The process includes the steps of gripping the terminals of the battery, reducing pressure within the battery by withdrawing fluid electrolyte from the cell housing, lifting the cell while maintaining the reduced pressure within the cell housing and placing the cell in the container while maintaining the reduced pressure within the cell housing.

BRIEF DESCRIPTION OF THE DRAWINGS

FIG. 2 shows a partially broken away front view of the apparatus of the present invention.

FIG. 3 shows a partially broken away side view of the present invention.

DETAILED DESCRIPTION OF THE INVENTION

Figure 1:
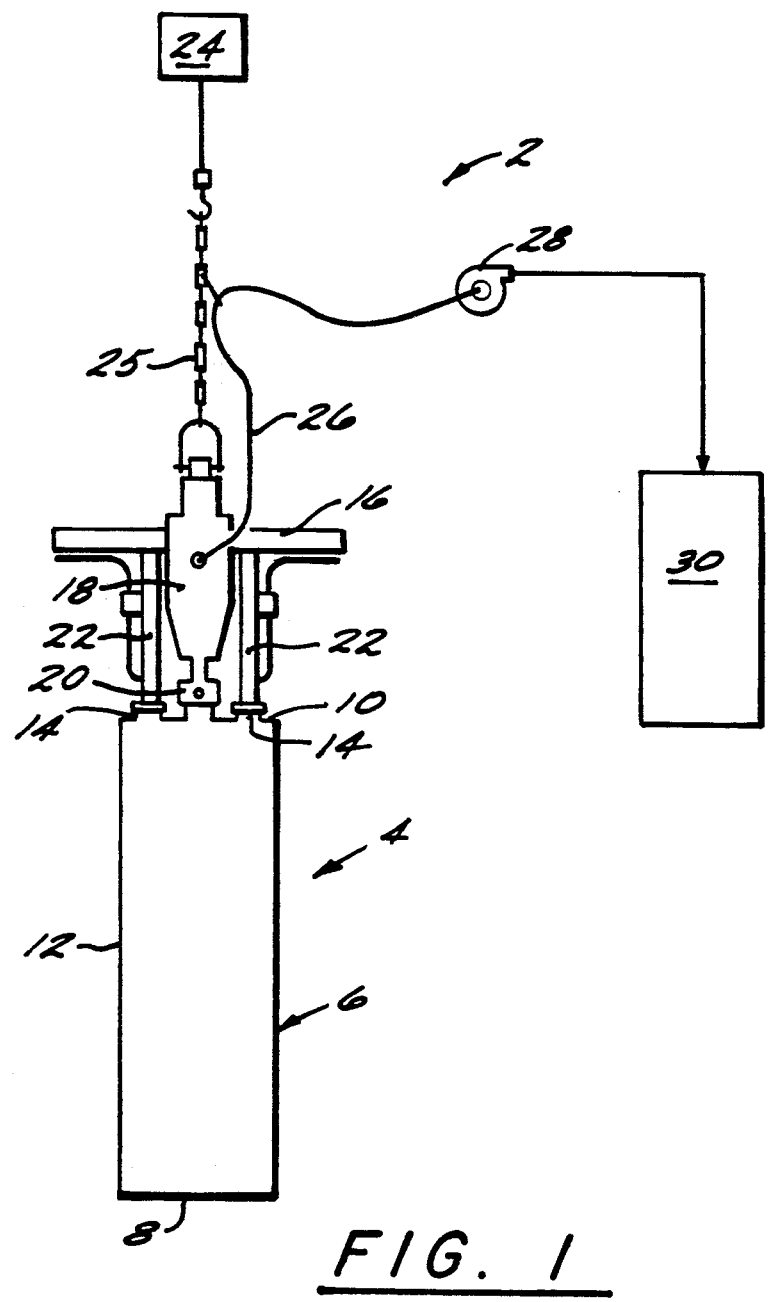
FIG. 1 shows a schematic view of the present invention.

FIG. 1 shows a schematic diagram of the apparatus of the present invention 2 connected to a battery cell 4.

The battery cell 4 includes a cell housing 6. The cell housing 6 includes a bottom 8, a top 10, side walls 12 and a pair of terminals 14. An electrolyte orifice (shown as element 86 in FIGS. 4 and 5) is provided in the top 10 of cell 4 for adding fluid electrolyte to the housing 6.

The apparatus of the present invention 2 includes a check valve 20 secured to the electrolyte orifice of the cell 4, a frame 16, an extraction head 18 secured to the frame 16, and a pair of clamps 22 which are mounted on the frame 16.

The extraction head 18 is secured in fluid flow engagement with the check valve 20 and the frame 16 assembly is suspended from a conventional hoist 24 by a chain 25.

The extraction head 18 is in fluid flow connection with a suction hose 26 and pump 28. The pump 28 discharges into a reservoir 30.

FIG. 2 shows a partially broken away front view of frame 16, extraction head 18 and clamps 22.

The extraction head 18 includes a housing 32 having an inner surface 34 which defines a chamber within housing 32. The housing 32 is bolted to the frame 16 at the midpoint of the frame 16. An annular bushing 36 is secured to the inner surface 34. A plunger 38 is slidable received within housing 32. Plunger 38 extends from a hemispherical first end 40 to a second end 42 and has an inner surface 44 defining a flow passage between the first end 40 and second end 42 of plunger 38. Second end 42 is internally threaded and has a circumferential shoulder 46. A tubular extension 48 extends from the threaded first end 50 to a circumferentially ridged top end 52. The second end 42 of plunger 38 threadably engages the first end 50 of extension 48 to compress gasket 51 (shown in FIG. 4) to sealingly connect plunger 38 with extension 48. The circumferentially ridged top end 52 of extension 48 sealingly contacts bushing 36 to prevent fluid from passing between the circumferentially ridged top end 52 and the inner surface 34 of housing 32. The inner diameter of collar 54 is smaller than the outer diameter of shoulder 46 and retains the second end 42 of plunger 38 with the housing 32. A spring 56 urges shoulder 46 into contact with collar 54. It will be appreciated that the above described arrangement allows the longitudinal distance between the hemispherical first end 40 of plunger 38 and frame 16 to be varied while maintaining a sealed fluid flow connection between the housing 32 and plunger 38.

Referring to FIGS. 2 and 3, tubular fitting 90 is secured to housing 32, has an inlet end 92 that communicates with the inner surface 34 and has an outlet end 93. Suction hose 26 is clamped to outlet end 94 of fitting 90.

Figure 4:
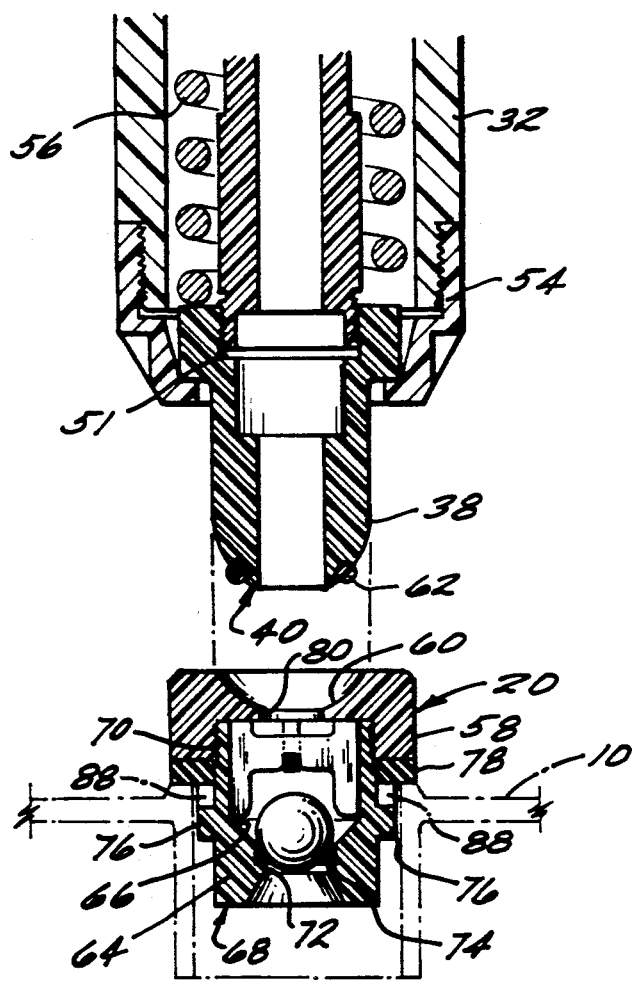
FIG. 4 shows a cross sectional view of a portion of the apparatus of the present invention.
Figure 5:
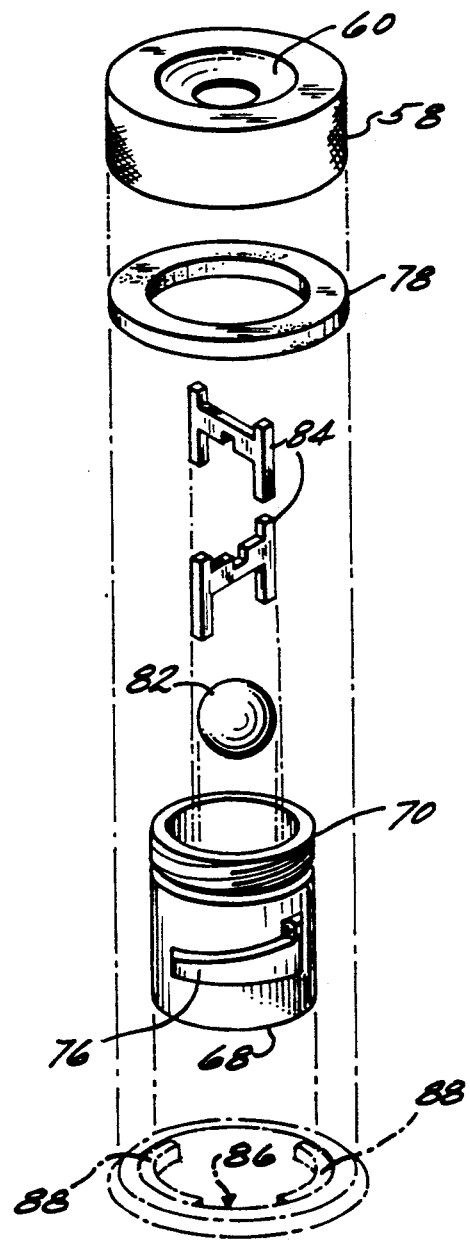
FIG. 5 shows an exploded view of the valve shown in FIG. 4.
Figure 6:
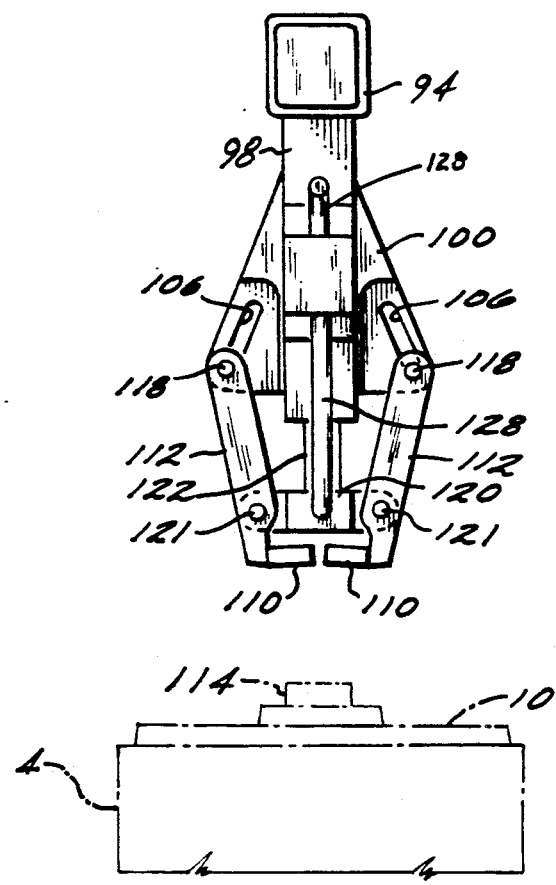
FIG. 6 shows a side view of the apparatus of the present invention above a battery cell.

Referring to FIGS. 2, 4 and 5, check valve 20 has a top member 58. The top member 58 has a top surface 60 which defines a concave hemispherical seat. The hemispherical first end 40 of plunger 38 and the concave hemispherical seat of top surface 60 are complimentarily contoured so that the first end 40 and top surface 60 may be brought into close fitting contact. An annular seal 62 is mounted in the hemispherical first end 40 for sealingly contacting the top surface 60.

The check valve 20 further includes a housing 64 having an inner surface 66, a bottom end 68, and an open top end 70. The bottom end defines an inlet orifice 72 communicating with inner surface 66 and the top end 70 is externally threaded. An annular seal 74 surrounds the inlet orifice. A pair of diametrically opposed radially projecting ramps 76 are provided on the outer circumferential surface of housing 64.

Top member 58 threadably engages the housing 64 to form a chamber within the check valve 20 and trap gasket 78 between the top member 58 and the ramps 76. Top member 58 defines an outlet orifice 80 communicating with the chamber with check valve 20.

A spherical float 82 is trapped within the chamber of check valve 20. The inner surface 66 of the housing 64 forms a conical depression for guiding the spherical float 82 into contact with annular seal 74 to seal the inlet orifice. A pair of transverse members 84 interlock to form a grid which prevents spherical float 82 from blocking the outlet orifice 80.

In use, the check valve 20 is inserted within the electrolyte orifice 86 defined in the top 10 of battery cell housing 6 and rotated so that ramps 76 engage tabs 88 on the top 10 of cell housing 6 to compress gasket 78 and sealingly secure the check valve to the top 10 of cell housing 6.

In use, extraction head 18 is lowered into contact with check valve 20. After gasket 62 of hemispherical first end 40 of plunger 38 contacts the hemispherical seat 60 of the top surface, further movement of housing 32 toward the check valve compresses gasket 62 and spring 56 to provide a leak-proof fluid flow path between extraction head 18 and check valve 20.

Referring again to FIG. 2, the present apparatus includes an assembly 132 for securing the frame to a means for lifting the frame, e.g. a chain lift. The assembly 132 includes a housing 134 secured to the top of frame 16 at the midpoint of frame 16 and defining an internal chamber. A plunger 136 is slidable received within housing 134 and has a shoulder 138. The plunger 136 has a first position wherein the plunger 136 is extended from the housing 134 and a second position wherein the plunger is withdrawn with the housing 134. A spring 140 urges the plunger into the second position. The plunger 136 may be secured to any suitable fitting, e.g. the yoke shown in phantom in FIGS. 2 and 3, for attaching the apparatus of the present invention to a lifting device. It will be appreciated that the assembly 132 provides shock absorbing properties to the apparatus of the present invention, whereby the jaws 108 will not be dislodged from gripping contact with the terminals 14 in the event of a shock imposed upon the bottom of the cell. In addition, the retractable plunger 38 of the extraction head 18 is capable of absorbing some shock and allows for vertical tolerance in the operation of the lifting device when operating the apparatus.

Referring to FIGS. 1, 2, and 3, the apparatus of the present invention includes a pair of clamps 22, disposed on opposite sides of extraction head 18. Each clamp 22 includes a sleeve 94, slidably mounted on frame 16. Each sleeve 94 is provided with a set screw 96 for clamping the sleeve 94 to the frame 16. A longitudinal member 98 extends perpendicularly downwardly from each sleeve 94. A wedge member 100 is secured to each longitudinal member 98. Each wedge member 100 has a bottom end 102 and a pair of converging sides 104, each converging upwardly from bottom end 102 to longitudinal member 98 and each defining a pair of angled slots 106. Each slot 106 extends parallel to one of the converging sides 104 of the wedge member 100.

Each clamping member includes a pair of jaws 108. Each jaw 108 includes a gripper portion 110 and a lever arm 112 extending from the gripper portion 110 to a first end 114. The first end 114 of each lever arm 112 defines a longitudinal slot 116. The wedge member 100 is received within each of the longitudinal slots 116. A pin 118 passes through each slot 106 in wedge member 100 and is secured to the first end 114 of each lever arm 112 to bridge the longitudinal slot 116 and slidably secure each lever arm 112 to the wedge member 100.

Each of the lever arms 112 is pivotably secured to an opposite end of a fulcrum member 120 by a pin 121 and is pivotable about the pin 121. A rod 122 extends perpendicularly upwardly from the midpoint of the fulcrum member 120 and is slidably received within a longitudinal chamber 124 defined within the longitudinal member 98. A spring 126 is provided within the longitudinal chamber 124 for urging the rod 122 and fulcrum member 120 downwardly. A handle 128 extends perpendicularly from each fulcrum member, then parallel to longitudinal member 98 and finally parallel to the sleeve 94. Each handle 128 is slidably received in a brace 130 mounted on longitudinal member 98.

Referring to FIGS. 3, 6, 8 and 9, spring 126 urges fulcrum member 120 downwardly relative to wedge member 100 thereby urging gripping portions 110 toward each other i.e. downward movement of pins 118 in slots 106 of wedge member 100 guides the first ends 114 of lever arms 112 apart from each other, thereby pivoting lever arms 112 about pins 121 and moving the gripping portions 110 toward each other.

Figure 7:
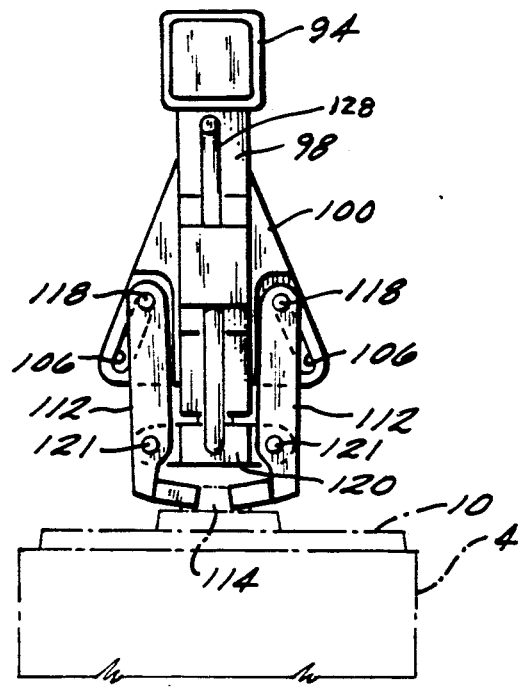
FIG. 7 shows a side view of the apparatus of the present invention in engagement with a battery cell.

Referring to FIG. 7, lifting handle 128 toward sleeve 94 moves the fulcrum member 120 upwardly relative to the wedge member 100 against the resistance of spring 126 which is shown in phantom in FIG. 7. Upward movement of fulcrum member 120 relative to wedge member 100 results in movement of the gripping portion 110 apart from each other, i.e. upward movement of pins 118 in slots 106 of wedge member 100 guides the first end 114 of the lever arms 112 toward each other, thereby pivoting lever arms 112 about pins 121 and moving gripping portions 110 apart from each other.

With reference to FIGS. 1, 2, 5 and 6, the process of the present invention wherein a battery cell is placed into a container is described below.

The process may, for example, be Performed by operating the above described apparatus and, while performance of the process is by no means limited to use of the specific apparatus described above, will be discussed and illustrated in terms of the above described apparatus.

The check valve 20 is installed in the electrolyte orifice 86 of the battery cell and rotated so that the interaction of tabs 88 and ramps 76 compress gasket 78 to provided a fluid tight seal.

Figure 8:
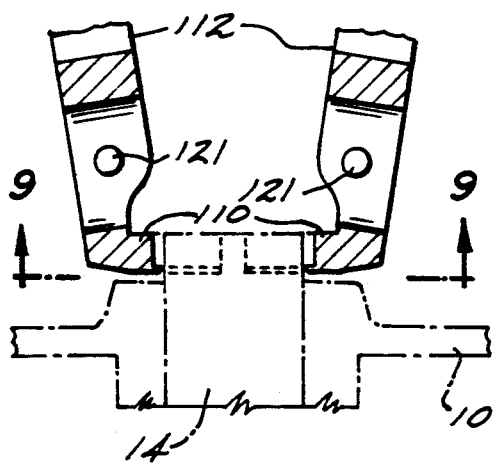
FIG. 8 shows a cross sectional view of a portion of the apparatus of the present invention.
Figure 9:
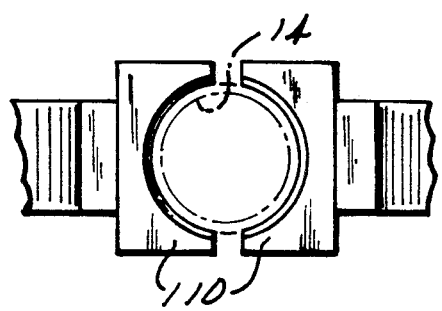
FIG. 9 shows a cross sectional view of the portion of the apparatus shown in FIG. 8.

The frame 16, extraction head 18 and clamp 22 assembly is lowered toward the battery cell. The handles 128 are lifted to move gripping portions 110 apart from each other and the hemispherical first end 40 of plunger 38 brought into contact with the hemispherical seat of top surface 60 of the check valve 20 so that annular seal 62 is compressed between first end 40 and top surface 60 to form a fluid tight seal between plunger 38 and check valve 20. The assembly is further lowered, thereby compressing spring 56, and placing gripping portions 110 of clamps 22 around terminals 14 of cell 4 as shown in FIGS. 7, 8 and 9. Handle 128 is released to allow gripping portions 110 to move toward each other and grip the terminals 14 therebetween.

Once the apparatus is engaged as described above, pump 28 is activated to reduce the pressure with the cell housing 6. Pump 28 provides a pressure differential to create a flow of electrolyte from the cell housing 6 through check valve 20, the flow passage of plunger 38, the chamber of housing 32, fitting 90, hose 26 and pump 28 and into reservoir 30. Preferably, electrolyte is withdrawn from cell housing 6 until ambient pressure compresses cell housing 6 against the electrode plates within the housing. It will be appreciated that check valve 20 allows the reduced pressure to be maintained within the cell housing 6 even if the pump 28 is turned off at this point. Once the pressure within the housing 6 is sufficiently reduced the pump 28 is shut off.

The battery cell 4 is lifted by lifting apparatus 2 of the present invention and transferred to the container. Typically, the acid extraction and lifting steps are conducted simultaneously to reduce process time. Once the battery cell 4 is placed in the container the terminals 14 are released from clamps 22 and the frame 16, extraction head 18 and clamp 22 assembly is lifted away from the battery cell 4. It will be appreciated that check valve 20 prevents entry of fluid, i.e. air, into the battery even after plunger 38 is disengaged, so that the reduced pressure is maintained within the cell housing 6.

The process may be repeated to transfer a plurality of battery cells into the container. Since the housings of the cells are compressed against the electrode plates within the cells, the cells may easily be placed within a tight fitting container, i.e. a container that is configured to provide a cross sectional area equal to an integer multiple of the nominal cross sectional area of each cell. Once the container is filled with cells, the check valves 20 may be removed from the cells to allow the pressure within the cell housings to equalize with the ambient pressure. Once the pressure is equalized the electrolyte head urges the cell housings to bulge outwardly against each other and against the walls of the container.

Electrolyte from reservoir 30 is then introduced to the cell in an amount effective to cover the electrode plates within the cell 4 and the battery cell 4 is ready for use. It will be clear to one skilled in the art that the above described process may be used to remove battery cells from the container.

While preferred embodiments have been shown and described, various modifications and substitutions may be made thereto without departing from the spirit and scope of the invention. Accordingly, it is to be understood that the present invention has been described by way of illustrations and not limitations.

What is claimed is:

1. An apparatus for moving a battery cell, said cell including a cell housing, a plurality of electrode plates within the housing, a pair of terminals extending outwardly from said cell housing and an electrolyte orifice and wherein the cell housing contains an electrolyte, said apparatus comprising:

clamp means for gripping the terminals of the cell;
   fluid transfer means for reducing pressure within the housing; and
   frame means for securing said clamp means and said fluid transfer means in a fixed spatial relationship so that said fluid transfer means is automatically secured in fluid flow connection with said electrolyte orifice when said clamp means is disposed in a gripping relationship with said terminals.

2. The apparatus of claim 1, wherein the clamp means comprises:
   a pair of opposed jaws, and
   means for moving said pair of jaws into and out of gripping contact with said terminals.

3. The apparatus of claim 2, wherein each of said jaws comprises:
   a gripper portion and a lever arm extending from the gripper portion to a first end, and said means for moving comprises:
   fulcrum means for pivotably securing said lever arms,
   wedge means for guiding said first end of said lever arms; and
   handle means for moving said fulcrum means and said lever means relative to said wedge means.

4. The apparatus of claim 1, wherein the means for reducing pressure comprises:
   valve means, operatively associated with said electrolyte orifice, for allowing fluid flow from said cell housing and preventing fluid flow into said cell housing, and vacuum means for removing fluid electrolyte from said cell housing through said valve means.

5. The apparatus of claim 4, wherein the vacuum means comprises:
pump means for providing a pressure differential, said pump means having an intake side and outlet side;
extraction head means for establishing fluid flow connection between the valve means and the inlet side of the pump means; and
reservoir means, in fluid flow connection with the outlet side of the pump means, for receiving fluid electrolyte from said cell housing.

6. The apparatus of claim 4, wherein the valve means comprises:
a valve housing defining an internal chamber, an inlet orifice communicating with said chamber and an outlet orifice communicating with said chamber;
float means, within said chamber, for preventing fluid flow through said housing in a flow direction from said outlet end to said inlet end; and
means for sealingly securing said valve housing in fluid flow connection with said electrolyte orifice so that the inlet orifice of the valve is secured within the cell housing.

7. The apparatus of claim 5, wherein the extraction head means comprises:
an extraction head housing having an internal chamber, an inlet opening communicating with the internal chamber and an outlet orifice communicating with the internal chamber;
connector means for establishing fluid flow connection between said valve means and said extraction head chamber, said connector means being slidably received by said inlet opening of the extraction head chamber and having a retracted position within said extraction head housing and and extended position extending from said extraction head housing;
resilient means for urging the connector means toward the extended position; and
limit means for limiting travel of the connector means to define said extended positions of the connector means.

8. The apparatus of claim 7, wherein the extraction head means further comprises first annular seal means, secured within the internal chamber for sealingly contacting the connector means.

9. The apparatus of claim 8, further comprising second annular seal means, secured to said connector means, for sealingly contacting said valve means.

10. The apparatus of claim 1, wherein said frame means comprises:
a tubular cross member, extraction head means secured to the tubular cross member at the midpoint of the cross member;
said clamp means comprising a pair of jaw means, each for gripping a separate one of the pair of terminals, said jaw means being slidably mounted on said cross member on opposite sides of extraction head means; and
second clamp means for preventing movement of said jaw means relative to said cross member.

11. The apparatus of claim 1, further comprising:
attachment means for securing said frame means to means for lifting the frame means, clamp means and fluid transfer means.

12. The apparatus of claim 11, wherein he attachment means comprises a housing secured to said frame means said housing defining a chamber therein and having an opening communicating the internal chamber;
a plunger slidably received within said chamber and having an extended position wherein the plunger extends from said opening and a withdrawn position wherein said plunger is contoured within said housing;
resilient means for urging said plunger into said withdrawn position, and
limit means for defining said extended position.

13. The device of claim 12, further comprising lifting means secured to said attachment means for lifting said apparatus.

14. A process for transferring a battery cell into a container, said battery cell including a cell housing, said housing defining a cell chamber, a plurality of electrode plates within the cell chamber, a pair of terminals extending outwardly from the cell housing and an electrolyte orifice communicating with the cell chamber, and wherein the cell housing contains an electrolyte, comprising:
gripping the terminals of the battery cell;
reducing pressure within the cell housing through said electrolyte orifice;
lifting the battery cell by the terminals while maintaining reduced pressure within the cell housing; and
placing the battery cell in the container while maintaining the reduced pressure within the cell housing.

15. The process of claim 14, wherein said step of reducing pressure comprises:
reducing pressure within the cell housing by an amount effective to compress the housing against the electrode plates within the housing.

16. The process of claim 15, further comprising:
repeating said steps of gripping, reducing, and lifting with each of a plurality of battery cells, and placing each of the cells in the container while maintaining reduced pressure within each of the cells.

17. The process of claim 14, further comprising:
venting the electrolyte orifice to the atmosphere, subsequent to placing the battery cell in the container, to equalize pressure within the cell with the atmosphere, and introducing an amount of electrolyte fluid to the cell housing through the electrolyte orifice effective to immerse the electrode plates of the cells.

18. The process of claim 14, wherein the cell housing of each of the battery cells exhibits substantially equal rectilinear cross sectional dimensions, the container has an opening for receiving cells and the opening exhibits rectilinear cross sectional dimensions that are substantially equal to an integer multiple of the cross sectional dimensions of one of the battery cells, and a number, equal to the integer, of cells are placed in the container in an ordered array of rows and columns.

* * * * *

UNITED STATES PATENT AND TRADEMARK OFFICE
CERTIFICATE OF CORRECTION

PATENT NO. : 5,071,444

DATED : Dec. 10, 1991

INVENTOR(S) : Mark C. Gaydos

It is certified that error appears in the above-identified patent and that said Letters Patent is hereby corrected as shown below:

Col. 1, line 33    Delete "provide" and insert therefore -- provides --.

Col. 5, line 14    Delete "FIG. 7" and insert therefore -- FIG. 3 --.

Col. 5, line 25    Delete "Performed" and insert therefore -- performed --.

Col. 7, line 36    Delete "and and" and insert therefore -- and an --.

Col. 7, line 59    Between "of" and "extraction" insert -- said --

Col. 8, line 4     Delete "he" and insert therefore -- the --.

Signed and Sealed this

Twenty-ninth Day of June, 1993

Attest:

MICHAEL K. KIRK

*Attesting Officer*     Acting Commissioner of Patents and Trademarks